US012152339B2

(12) United States Patent
Ianniello

(10) Patent No.: US 12,152,339 B2
(45) Date of Patent: Nov. 26, 2024

(54) LAUNDRY BASKET WITH HANDRAIL ASSIST

(71) Applicant: Domenico Ianniello, Fairview Park, OH (US)

(72) Inventor: Domenico Ianniello, Fairview Park, OH (US)

( * ) Notice: Subject to any disclaimer, the term of this patent is extended or adjusted under 35 U.S.C. 154(b) by 303 days.

(21) Appl. No.: 17/446,154

(22) Filed: Aug. 26, 2021

(65) Prior Publication Data

US 2023/0064574 A1 Mar. 2, 2023

(51) Int. Cl.
*D06F 95/00* (2006.01)
*A61H 3/00* (2006.01)

(52) U.S. Cl.
CPC ............. *D06F 95/002* (2013.01); *A61H 3/00* (2013.01); *A61H 2003/001* (2013.01); *A61H 2201/0157* (2013.01)

(58) Field of Classification Search
CPC ... D06F 95/002; A61H 3/00; A61H 2003/001; A61H 2201/0157
See application file for complete search history.

(56) References Cited

U.S. PATENT DOCUMENTS

| | | | | | |
|---|---|---|---|---|---|
| 369,832 | A | * | 9/1887 | Bardell | B65D 25/32 220/758 |
| 790,689 | A | * | 5/1905 | Judkins | A47B 95/02 16/419 |
| 864,761 | A | * | 8/1907 | Erickson | B65D 21/0213 206/509 |
| 2,549,282 | A | * | 4/1951 | Aschbrenner | B65D 7/02 220/772 |
| 2,767,565 | A | * | 10/1956 | Ernst | A47G 23/06 294/27.1 |
| 3,015,412 | A | * | 1/1962 | Klages | A47J 47/18 220/769 |
| D195,903 | S | * | 8/1963 | Bogart | D3/312 |
| 3,170,594 | A | * | 2/1965 | Nascher | B65D 21/045 D3/304 |
| 3,179,287 | A | * | 4/1965 | Rickmeier, Jr. | A47J 36/2405 220/759 |
| 5,004,882 | A | * | 4/1991 | Nottingham | A47J 36/027 219/732 |
| 5,050,526 | A | * | 9/1991 | Nelson | B63B 35/26 224/406 |
| 5,287,991 | A | | 2/1994 | Koda | |
| 6,349,843 | B1 | * | 2/2002 | Mittmann | A47J 27/13 220/756 |
| 6,672,473 | B2 | * | 1/2004 | Torniainen | B65D 21/0233 220/657 |
| 6,705,210 | B2 | * | 3/2004 | Leonard | A47J 43/287 220/573.1 |
| 7,207,460 | B2 | * | 4/2007 | Sander | D06F 95/002 220/676 |
| 2013/0062357 | A1 | * | 3/2013 | Souza | D06F 95/002 220/676 |
| 2015/0069077 | A1 | | 3/2015 | Monk | |
| 2018/0328043 | A1 | | 11/2018 | Koledoye | |

* cited by examiner

*Primary Examiner* — Tri M Mai
(74) *Attorney, Agent, or Firm* — CURATOLO SIDOTI & TRILLIS CO., LPA; Floyd Trillis, III; Salvatore A. Sidoti

(57) ABSTRACT

An article of manufacture for providing a laundry basket with handrail assist according to the present invention is disclosed.

3 Claims, 4 Drawing Sheets

LAUNDRY BASKET WITH HANDRAIL ASSIST

TECHNICAL FIELD

This application relates in general to an article of manufacture for providing a safety device, and more specifically, to an article of manufacture providing a laundry basket with handrail assist.

BACKGROUND

A safety problem of falling or not being able to maintain stability/balance while descending stairs with a laundry basket exists, whether it be because of old age, disability, or objects on the stairs. In order to carry a basket, a user cannot use either hand on a stair rail to steady themselves as they climb and descend a flight of steps.

Therefore, a need exists for an article of manufacture for providing a laundry basket with handrail assist. The present invention attempts to address the limitations and deficiencies in prior solutions according to the principles and example embodiments disclosed herein.

SUMMARY

In accordance with the present invention, the above and other problems are solved by an article of manufacture providing a laundry basket with handrail assist according to the principles and example embodiments disclosed herein.

In one embodiment, the present invention is an article of manufacture for providing a laundry basket with handrail assist. The laundry basket includes a carrying basket having a top edge, a plurality of sides having a longer length and a shorter length, a plurality of handles in each of the plurality of sides, an extended lip along the top edge of the carrying basket, and a set of extended side channels coupled to the extended lip of the top edge of the shorter lengths. The set of extended side channels have an opening between a part of the extended side channels on each side exposing the plurality of handles to be grasped.

In another aspect of the present invention, the set of extended side channels is coupled to the extended lip along the top edge of the carrying basket using attachment devices.

In another aspect of the present invention, the attachment devices are screws.

In another aspect of the present invention, the set of extended side channels is integrated into the extended lip channel along each of the shorter lengths.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
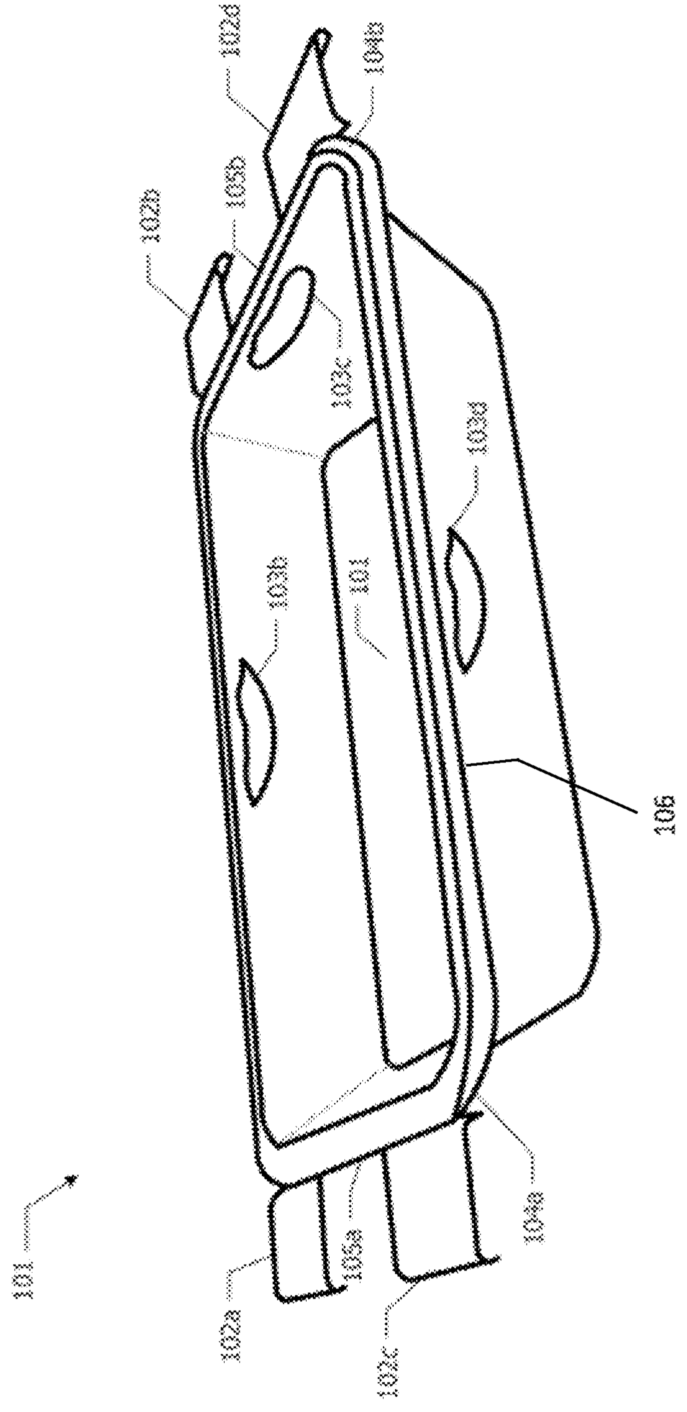
FIG. 1 illustrates a side perspective of an example embodiment of an article of manufacture providing a laundry basket with handrail assist according to the present invention.

This application relates in general to an article of manufacture for providing a safety device, and more specifically, to an article of manufacture providing a laundry basket with handrail assist according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing a laundry basket with handrail assist according to the present invention. The term user herein refers to one or more users.

The term "invention" or "present invention" refers to the invention being applied for via the patent application with the title "Laundry Basket with Handrail Assist." Invention may be used interchangeably with basket.

In general, the present disclosure relates to an article of manufacture providing a laundry basket with handrail assist according to the present invention. To better understand the present invention, FIG. 1 illustrates a side perspective of an example embodiment of an article of manufacture providing a laundry basket with handrail assist according to the present invention.

The laundry basket 101 has an extended lip 106 along the top edge of the carrying basket, and an extended side channel 102*a-d* surrounding the handles on both sides 103*a-d*. The extended side channel 102*a-d* runs the entire length of the handle sides 104*a-b* of the basket except for openings 105*a-b* to utilize the handles 103*a-b*. The extended side channel 102*a-d* may rest on and slowly slide down one handrail at the speed of the user allowing the user to safely keep one hand on the basket 101 and one hand on the handrail. The extended side channels 102*a-d* are rounded off enough to not be impeded by the handrail brackets.

Figure 4:
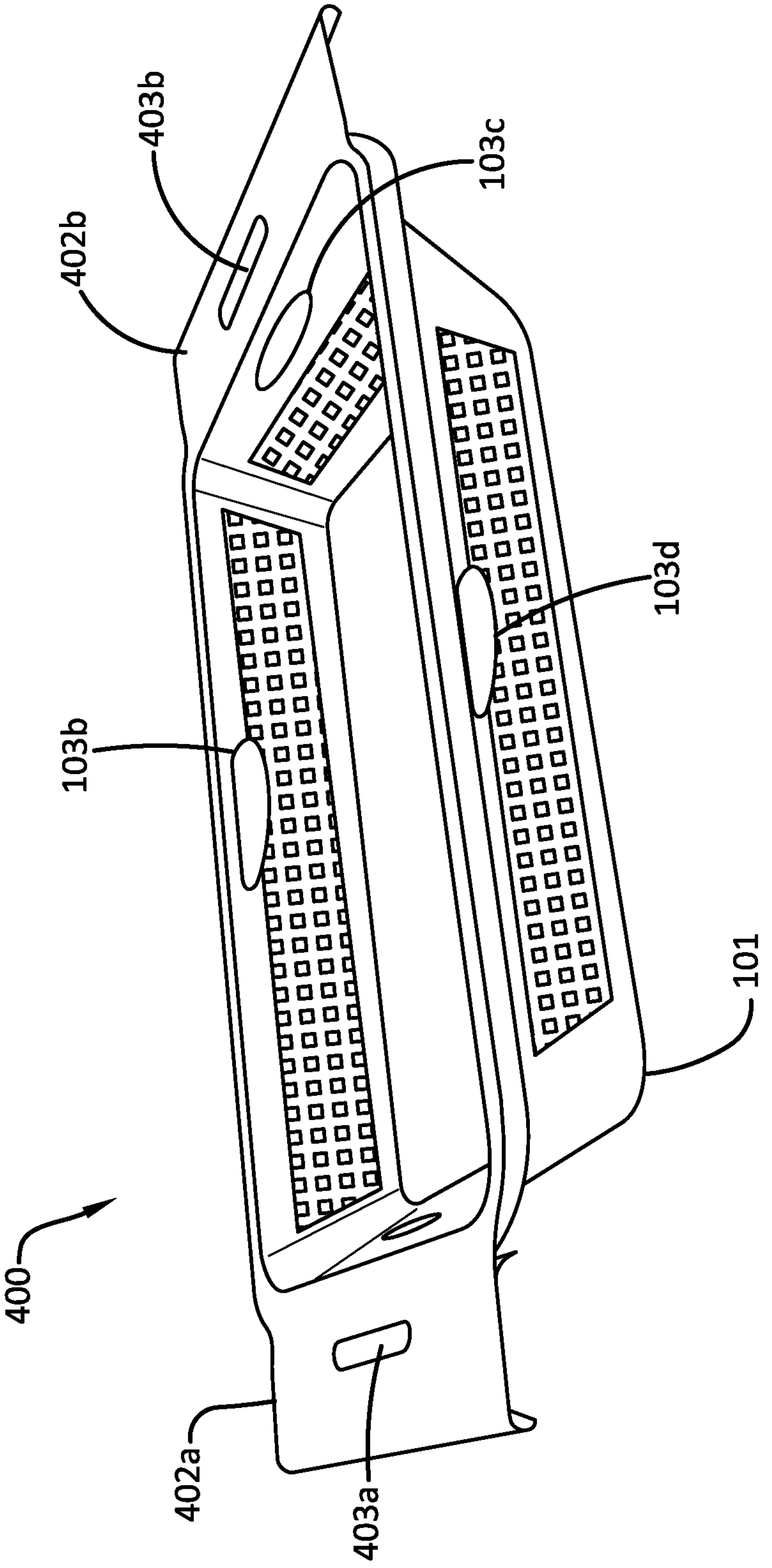
FIG. 4 illustrates a side perspective view of another embodiment of an article of manufacture providing a laundry basket with handrail assist according to the present invention.

Ultimately, a manufactured laundry basket 101 would have the extended side channels 102*a-d* seamlessly incorporated and rounded into the body of the laundry basket 101 as shown in FIG. 4. The laundry basket 101 may be made from injection molded plastic material or similar synthetic materials that provide a lightweight basket with sufficient strength to hold clothing and linens/towels. In alternate embodiments, the extended side channels 102*a-d* may be separately formed extensions made of a rigid material that can be attached by screws to the laundry basket 101.

Figure 2:
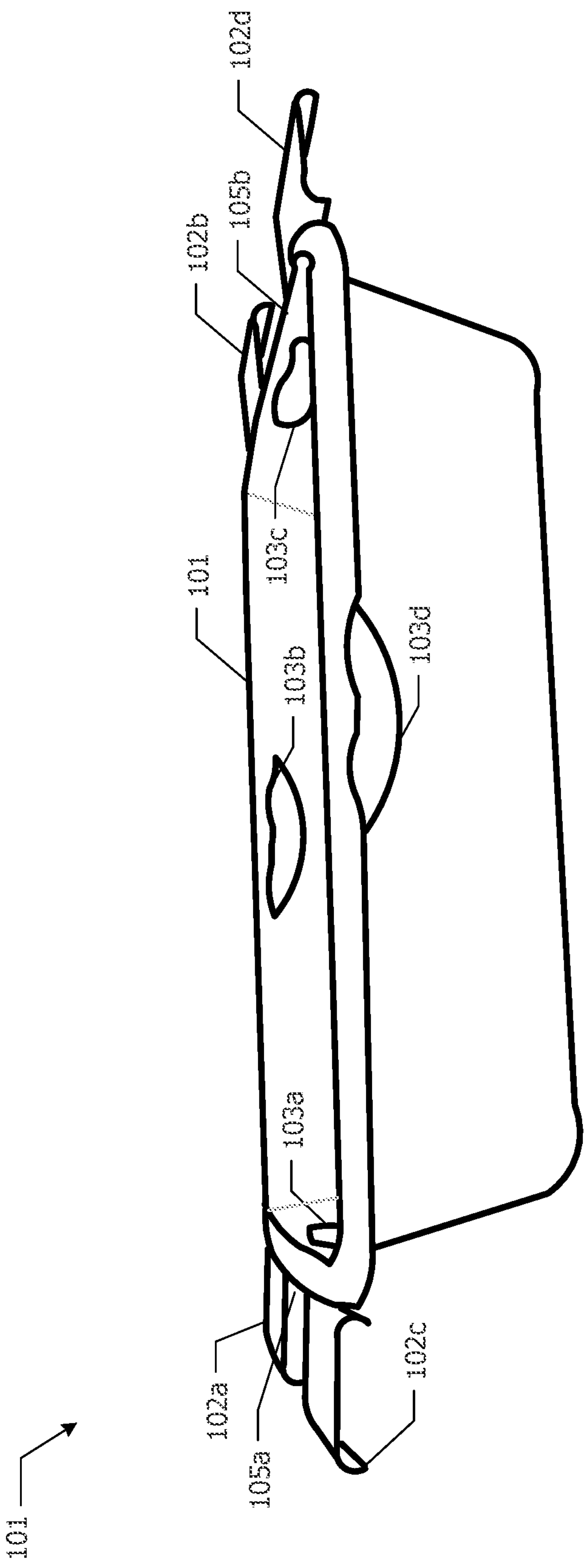
FIG. 2 illustrates a side view of an article of manufacture providing a laundry basket with handrail assist according to the present invention.

FIG. 2 illustrates a side view of an article of manufacture providing a laundry basket with handrail assist according to the present invention. The laundry basket 101 is again shown with extended side channels 102*a-d* surrounding the handles on both sides 103*a-d*. The use of the laundry basket 101 allows a user to be more stable and in control while walking downstairs with a laundry basket because of having the ability to safely rest one side of the basket on the handrail while also keeping one hand on the handrail.

Figure 3:
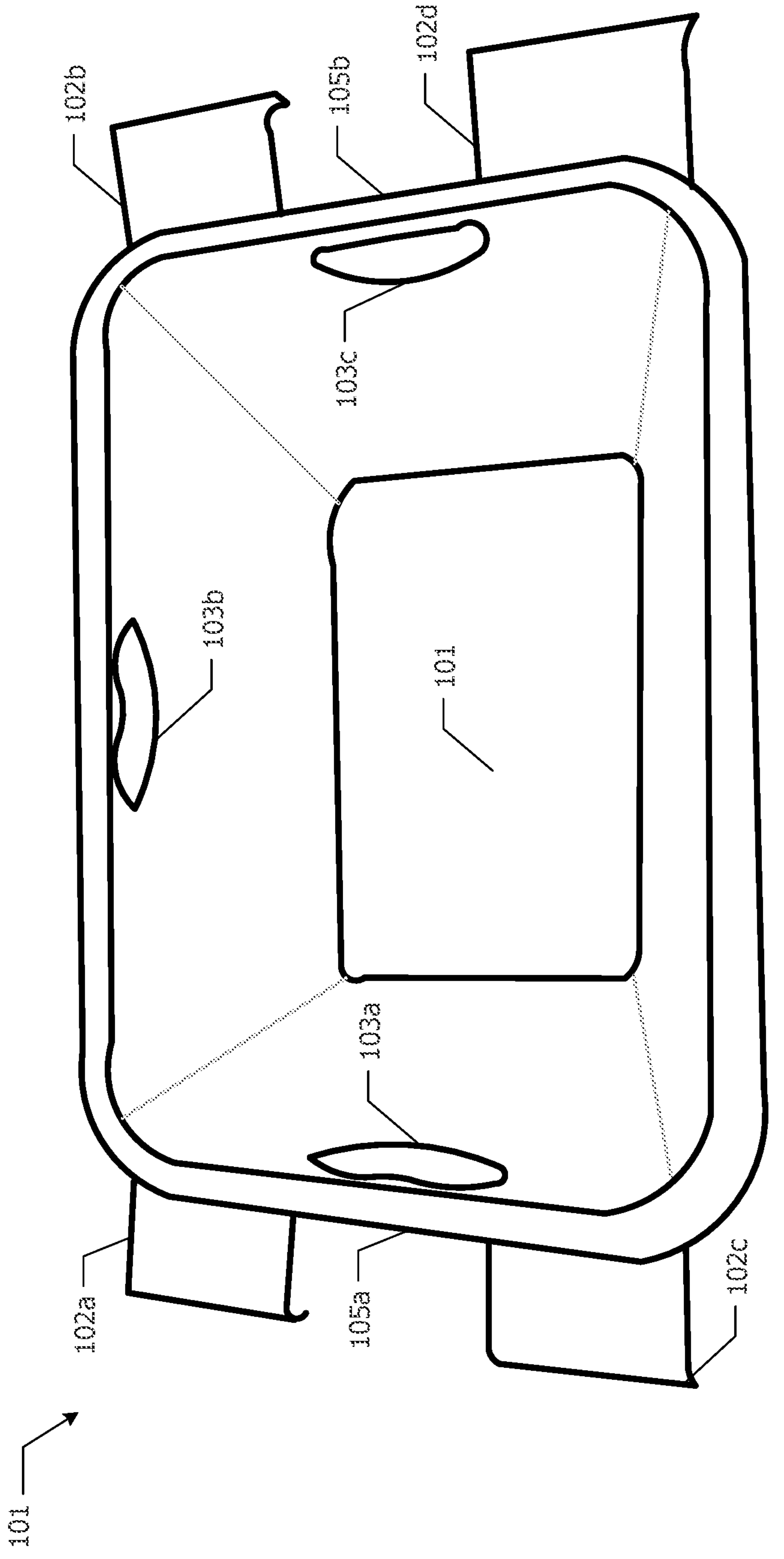
FIG. 3 illustrates a top view of an article of manufacture providing a laundry basket with handrail assist according to the present invention.

FIG. 3 illustrates a top view of an article of manufacture providing a laundry basket with handrail assist according to the present invention. A top view of the laundry basket 101 is shown with extended side channels 102*a-d* surrounding the handles on both sides 103*a-d*. The extended side channels 102*a-d* may be seen running the entire length of the handle sides 104*a-b* of the basket except for openings 105*a-b* to utilize the handles 103*a-b*.

FIG. 4 illustrates a side perspective view of another embodiment of an article of manufacture providing a laundry basket with handrail assist according to the present invention. In this embodiment 400, the laundry basket 400 is formed with integrated extended side lips/channels 402*a-b*. In contrast to the embodiments of FIGS. 1-3, the alternate embodiment of FIG. 4 400, includes a pair of handle openings 403*a-b* within the integrated extended side channels 402*a-b* that are arranged to permit the user to grasp both the handle openings 403*a-b* in the integrated extended side channels 402*a-b* with a corresponding handles 103*a-c* at the same time. The laundry basket 400 may also include a pattern of small vent openings 404*a-d* having various shapes, sizes, and arrangements in the side walls of the laundry basket 401 for both aesthetic and functional venting purposes.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture providing a laundry basket with handrail assist, the laundry basket comprises:
- a carrying basket having a top edge, a plurality of sides having a longer length and a shorter length, and a plurality of handles in each of the plurality of sides;
- an extended lip along the top edge of the carrying basket; and
- a set of extended side channels coupled to the extended lip of the top edge of the shorter lengths sides of the carrying basket, wherein the set of extended side channels comprise two extended side channels on each of the shorter length sides of the carrying basket, the set of extended channels having an opening between a part of the extended channels on each side exposing the plurality of handles to be grasped, wherein the extended channels are configured to rest on and slide along a handrail, and wherein the extended channels do not impede handrail brackets during use.

2. The article of manufacture according to claim 1, wherein the carrying basket is made of injection molded plastic material.

3. An article of manufacture providing a laundry basket with handrail assist, the laundry basket comprises:
- a carrying basket made of injection molded plastic material and having a top edge, a plurality of sides having a longer length and a shorter length;
- an extended lip along the top edge of the carrying basket; and
- an extended side channel having a handle opening;
- wherein the lip and channel are seamlessly incorporated with the body of the carrying basket wherein the extended channel is configured to rest on and slide along a handrail, wherein the extended channel does not impede handrail brackets during use, and wherein the channel has open ends and a side that is rounded off to prevent the basket from sliding off a handrail, and wherein the channel extends substantially the entire length of the shorter length of the basket.

* * * * *